(12) United States Patent
Anderson

(10) Patent No.: US 12,363,473 B2
(45) Date of Patent: Jul. 15, 2025

(54) AUDIO SYSTEMS, DEVICES, MEMS MICROPHONES, AND METHODS THEREOF

(71) Applicant: Dean Robert Gary Anderson, Orem, UT (US)

(72) Inventor: Dean Robert Gary Anderson, Orem, UT (US)

(*) Notice: Subject to any disclaimer, the term of this patent is extended or adjusted under 35 U.S.C. 154(b) by 0 days.

(21) Appl. No.: 18/238,482

(22) Filed: Aug. 26, 2023

(65) Prior Publication Data

US 2023/0403501 A1 Dec. 14, 2023

Related U.S. Application Data

(63) Continuation of application No. 17/892,090, filed on Aug. 21, 2022, now Pat. No. 11,743,635, which is a continuation of application No. 16/792,136, filed on Feb. 14, 2020, now Pat. No. 11,432,066.

(60) Provisional application No. 62/805,866, filed on Feb. 14, 2019.

(51) Int. Cl.
*H04R 25/00* (2006.01)
*G06F 3/16* (2006.01)
*H04R 1/30* (2006.01)
*H04R 19/04* (2006.01)

(52) U.S. Cl.
CPC ............. *H04R 1/30* (2013.01); *G06F 3/167* (2013.01); *H04R 19/04* (2013.01); *H04R 25/405* (2013.01); *H04R 25/407* (2013.01); *H04R 25/604* (2013.01); *H04R 2201/003* (2013.01); *H04R 2410/01* (2013.01)

(58) Field of Classification Search
CPC .......... G06F 3/167; H04R 1/30; H04R 19/04; H04R 2201/003; H04R 2410/01; H04R 25/405; H04R 25/407; H04R 25/604; H04R 1/34; H04R 2225/021; H04R 25/02; H04R 25/48
USPC .......................................................... 381/313
See application file for complete search history.

(56) References Cited

U.S. PATENT DOCUMENTS

| 8,213,634 | B1 | 7/2012 | Daniel |
| 8,452,038 | B2 * | 5/2013 | Buccafusca ......... G10K 11/025 381/342 |
| 2013/0308813 | A1 | 11/2013 | Santini et al. |
| 2014/0262600 | A1 | 9/2014 | Hughes, II |
| 2018/0359565 | A1 | 12/2018 | Kim et al. |

FOREIGN PATENT DOCUMENTS

| CN | 101098569 B | * | 6/2011 | |
| CN | 107396269 A | * | 11/2017 | ............. H04R 1/345 |
| DE | 2731783 A1 | | 1/1979 | |
| WO | 2018026657 A1 | | 2/2018 | |

OTHER PUBLICATIONS

CN 107396269 A. English Translation (Year: 2017).*
CN 101098569 B. English Translation (Year: 2011).*

* cited by examiner

*Primary Examiner* — Phylesha Dabney
(74) *Attorney, Agent, or Firm* — Daniel Anderson

(57) ABSTRACT

In one embodiment, a MEMS microphone can be coupled to an acoustic horn to provide various benefits and improvements including, but not limited to, at-a-distance acoustic signal reception with improvements in signal-to-noise ratio and directional preference.

12 Claims, 9 Drawing Sheets

AUDIO SYSTEMS, DEVICES, MEMS MICROPHONES, AND METHODS THEREOF

CROSS-REFERENCE TO RELATED APPLICATIONS

The present application is a continuation application of co-pending U.S. patent application Ser. No. 17/892,090, filed on Aug. 21, 2022, which claims the benefit of priority to U.S. patent application Ser. No. 16/792,136 filed on Feb. 14, 2020, which issued as U.S. Pat. No. 11,432,066 on Aug. 30, 2022, which claims the benefit of priority from U.S. Provisional Application No. 62/805,866, filed on Feb. 14, 2019, all of which are hereby fully incorporated by reference.

BACKGROUND

The present invention relates, in general, to electronics, and more particularly to audio systems, hearing aids, over-the-counter hearing aids, hearables, wearables, personal sound amplifiers, acoustic surveillance tools, built-in microphone systems, MEMS microphones, cell phones, tablets, computers, televisions, vehicle infotainment systems, smart speakers and devices, voice controlled systems, audio devices, and/or methods.

Sound pressure levels can be measured in units called decibels (abbreviated as dB). Sound levels diminish as the distance between a sound source and the sound receiver increases. For example, conversational speech measured as 65 dB at 50 centimeters away from a speaker can measure at 45 dB when measured from 500 centimeters away. Human speech is typically comprised of voiced and unvoiced sounds that are produced at a wide variety of frequencies. A large portion of human speech information is transmitted at frequencies above 1500 Hz.

A microphone is a transducer that converts sound into an electrical signal. Microphone self-noise (or equivalent noise level) is an electrical signal which a microphone produces of itself. Microphone self-noise can occur even when no sound source is present. Microphone self-noise can be a problem in many audio systems. Increased microphone self-noise decreases the signal-to-noise ratio (SNR) of a microphone. The noise generated by microphone self-noise can be distracting to users of audio systems and can make it difficult for users of an audio system to understand the intended signal. In order to increase SNR, a relatively noisy mic can be placed closer to the source to increase the signal strength. Generally, microphones that are rated with lower self-noise and higher SNR are expensive, large diaphragm, condenser-type microphones.

MEMS (MicroElectroMechanical Systems) microphones are variants of the condenser microphone design. A pressure-sensitive diaphragm can be etched directly into a silicon wafer by MEMS processing techniques. MEMS microphones can be very small and low cost. The port opening of a package containing a MEMS microphone can be a mere 0.2 millimeters (mm). The die size of a MEMS microphone may be even smaller. Conventional MEMS microphones, however, suffer from high self-noise figures as a consequence of their small size. Conventional MEMS microphones are also omni-directional, meaning that they show no preference for incoming signal direction. In order to achieve directional preference with a MEMS microphone system, conventional MEMS microphone systems use an array of MEMS microphones and signal processing techniques.

A small and low cost microphone is desirable for many audio systems, including for example, audio system applications requiring directional preference and at-a-distance acoustic signal reception.

Accordingly, it is desirable to have a MEMS microphone or microphone system that exhibits, among other things, high SNR and directional preference without requiring an array of microphones and increased signal processing. Additionally, it is beneficial for such a system to be physically configured to achieve high manufacturability, compact dimensions for small applications, and reduced cost while maintaining and improving efficacy.

Figure 1:
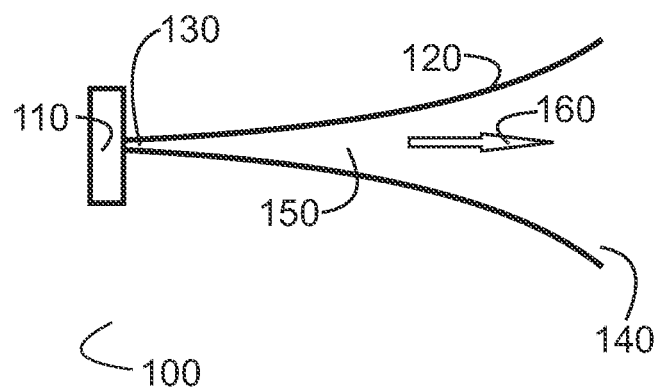
FIG. 1 illustrates a schematic diagram of an acoustic horn for MEMS microphones, audio systems and/or devices in accordance with various embodiments.

The drawings and detailed description are provided in order to enable a person skilled in the applicable arts to make and use the invention. The systems, structures, circuits, devices, elements, schematics, signals, signal processing schemes, flow charts, diagrams, algorithms, frequency values and ranges, amplitude values and ranges, methods, source code, examples, etc., and the written descriptions are illustrative and not intended to be limiting of the disclosure. Descriptions and details of well-known steps and elements are omitted for simplicity of the description.

For simplicity and clarity of the illustration, elements in the figures are not necessarily drawn to scale, and the same reference numbers in different figures denote the same elements.

As used herein, the term and/or includes any and all combinations of one or more of the associated listed items. In addition, the terminology used herein is for the purpose of describing particular embodiments only and is not intended to be limiting of the disclosure. As used herein, the singular forms are intended to include the plural forms as well, unless the context clearly indicates otherwise. It will be further understood that the terms comprise, comprises, comprising, include, includes, and/or including, when used in this specification and claims, are intended to specify a non-exclusive inclusion of stated features, numbers, steps, acts, operations, values, elements, and/or components, but do not preclude the presence or addition of one or more other features, numbers, steps, acts, operations, values, elements, components, and/or groups thereof. It will be understood that, although the terms first, second, etc. may be used herein to describe various signals, portions of signals, ranges, members, and/or elements, these signals, portions of signals, ranges, members, and/or elements should not be limited by these terms. These terms are only used to distinguish one signal, portion of a signal, range, member, and/or element from another. Thus, for example, a first signal, a first portion of a signal, a first range, a first member, and/or a first element discussed below could be termed a second signal, a second portion of a signal, a second range, a second member, and/or a second element without departing from the teachings of the present disclosure. It will be appreciated by those skilled in the art that words, during, while, concurrently, and when as used herein related to audio systems, devices, methods, signal processing and so forth, are not limited to a meaning that an action, step, function, or process must take place instantly upon an initiating action, step, process, or function, but can be understood to include some small but reasonable delay, such as propagation delay, between the reaction that is initiated by the initial action, step, process, or function. Additionally, the terms during, while, concurrently, and when are not limited to a meaning that an action, step, function, or process only occur during the duration of another action, step, function, or process, but can be understood to mean a certain action, step, function, or process occurs at least within some portion of a duration of another action, step, function, or process or at least within some portion of a duration of an initiating action, step, function, or process or within a small but reasonable delay after an initiating action, step, function, or process. Furthermore, as used herein, the term range, may be used to describe a set of frequencies having an approximate upper and approximate lower bound, however, the term range may also indicate a set of frequencies having an approximate lower bound and no defined upper bound, or an upper bound which is defined by some other characteristic of the system. The term range may also indicate a set of frequencies having an approximate upper bound and no defined lower bound, or a lower bound which is defined by some other characteristic of the system. Reference to "one embodiment" or "an embodiment" means that a particular feature, structure, or characteristic described in connection with the embodiment is included in at least one embodiment of the present disclosure. Thus, appearances of the phrases "in one embodiment" or "in an embodiment" in various places throughout this specification are not necessarily all referring to the same embodiment, but in some cases it may. The use of words about, approximately or substantially means a value of an element is expected to be close to a stated value or position. However, as is well known in the art there are always minor variances preventing values or positions from being exactly stated. It is further understood that the embodiments illustrated and described hereinafter suitably may have embodiments and/or may be practiced in the absence of any element that is not specifically disclosed herein. Furthermore, it is understood that in some cases the embodiments illustrated and described hereinafter suitably may have embodiments and/or may be practiced with one or more of the illustrated or described elements, blocks, or signal processing steps omitted.

Those skilled in the art will understand that as used herein, the term audible frequencies can refer to a range of frequencies associated with the range of frequencies generally audible to humans, for example, from about 20 Hertz ("Hz") to about 20,000 Hz. In addition, as used herein, audible frequencies can also refer to any frequency or frequency range where the invention described herein may find application.

Those skilled in the art will understand that as used herein, the term effective length can refer to a linear length, a coiled length, an unfolded length, an unbent length, an acoustic length, or a length that will be equal to or will be qualitatively consistent with a corresponding physical length for air-conduction sound propagation.

Those skilled in the art will understand that as used herein, the terms audio device or audio system may, can refer to a stand-alone system or a subsystem of a larger system. A non-limiting list of example audio systems can include: hearing aids, over-the-counter hearing aids, hearables, wearables, personal sound amplifiers, televisions, radios, cell phones, telephones, computers, laptops, tablets, vehicle infotainment systems, audio processing equipment and devices, personal media players, portable media players, audio reception systems, receivers, public address systems, media delivery systems, internet media players, smart speakers and devices, voice controlled systems, voice activated systems, recording devices, acoustic surveillance tools, built-in microphone systems, MEMS microphones, audio devices, subsystems within any of the above devices or systems, or any other device or system which processes audio signals.

Multiple instances of embodiments described or illustrated herein may be used within a single audio device or system. As an example, multiple instances of embodiments described or illustrated herein may enable the use of multiple MEMS microphones. As another example, multiple instances of embodiments described or illustrated herein may enable a stereo audio device comprising a first instance of an embodiment for a right MEMS microphone and a second instance of an embodiment for a left MEMS microphone.

The inventor is fully informed of the standards and application of the special provisions of 35 U.S.C. § 112(f). Thus, the use of the words "function," "means" or "step" in the Detailed Description of the Invention or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for" and the specific function (e.g., "means for filtering"), without also reciting in such phrases any structure, material or act in support of the function. Thus, even when the claims recite a "means for . . . " or "step for . . . " if the claims also recite any structure, material, or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the illustrated embodiments, but in addition, include any and all structures, materials, or acts that perform the claimed function as described in alternative embodiments or forms of the invention, or that are well known present or later-developed, equivalent structures, material, or acts for performing the claimed function.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software, hardware or a combination of both. It should be noted that there are many different and alternative configurations, devices, and technologies to which the disclosed inventions may be applied. Thus, the full scope of the invention is not limited to the examples that are described below.

Various representative implementations of the present invention may be applied to any system for audio devices. For example, certain representative implementations may include: hearing aid devices, personal sound amplification products, acoustic surveillance tools, built-in microphone systems, audio systems, devices, and methods.

DETAILED DESCRIPTION OF THE DRAWINGS

FIG. 1 illustrates a schematic diagram of an audio system 100. Audio system 100 can comprise a MEMS microphone 110 and an acoustic horn 120 which can be coupled directly or indirectly (e.g. via an intermediate structure, material, or attachment mechanism) to MEMS microphone 110. MEMS microphone 110 may be any type of MEMS microphone, for example, MEMS microphone 110 may be a MEMS microphone die, a substrate of a MEMS microphone, a circuit board to which a MEMS microphone is mounted, a top port MEMS microphone, a bottom port MEMS microphone, a side port MEMS microphone, a MEMS microphone with digital output, or a MEMS microphone with analog output. Acoustic horn 120 may be any type of acoustic horn, for example, acoustic horn 120 can be an exponential horn, a parabolic horn, a conical horn, a hyperbolic horn, a hyperbolic-exponential or hypex horn, a tractrix horn, a flaring horn, a horn with a smooth continuous surface, or a horn with a discontinuous or stepped surface. Acoustic horn 120 can be made from any type of material suitable for an acoustic horn, including for example, plastics, polymers, metals, alloys, ceramics, materials facilitating acoustic amplification, materials facilitating acoustic attenuation, and mixtures or combinations thereof, etc.

Acoustic horn 120 can act as an acoustic transformer, changing low pressure and high volume at the mouth 140 of horn 120 to high pressure and low volume at the throat 130 of horn 120. The cross-sectional area 150 of horn 120 can be designed to increase from throat 130 along the axis 160 toward mouth 140. The cross-sectional area 150 of horn 120 may be of any shape, for example, cross-sectional area 150 may be circular, oval, rectangular, square, multi-sided, or combinations of these. For an exponential horn, cross-sectional area 150 ($A_x$) of the horn 120 at each location along axis 160 can equal the cross-sectional area at the throat 130 ($A_t$) of the horn times Euler's number (e=2.71818 . . . ) raised to the power of the quantity: 4 times pi times 'x' divided by the wavelength ($\lambda$) of the cutoff frequency of the horn, where x represents the variable length at each location along axis 160 as measured from throat 130; according to the equation:

$$A_x = A_t e^{4\pi x/\lambda}$$

According to an embodiment, the diameter of throat 130 can be about 1 millimeter (mm) and the cutoff frequency of horn 120 can be designed to equal about 1000 Hz. The acoustic wavelength of a 1000 Hz signal can be about 34 centimeters (cm). To act as an acoustic transformer, the effective length of the horn from throat 130 to mouth 140 can be at least ¼ of the wavelength at the cutoff frequency or about 8.5 cm according to an embodiment. This can result in a diameter of mouth 140 of about 4.8 mm. Efficient amplification for this embodiment can begin at ½ octaves above the cutoff frequency or about 1500 Hz, where a large portion of speech information exists. The configuration of horn 120, creates an amplified signal prior to the acoustic signal reception by MEMS microphone 110. This results in an improved signal-to-noise ratio. The acoustic horn 120 can also provide directional preference for the MEMS microphone 110. As shown, the size of acoustic horn 120 can be determined by the specified cutoff frequency and the diameter of throat 130. Accordingly, the embodiments described herein can exploit the small port characteristics of the MEMS microphone and high frequency content of intelligible human speech to great advantages. The embodiments described herein and their associated advantages and benefits, uniquely applied to audio systems designed for improving human speech intelligibility, have not heretofore been recognized by any prior art usages of MEMS microphones despite the long existence and understanding of horns to those of ordinary skill in the relevant arts.

According to another embodiment, audio system 100 can have an acoustic horn 120 which can form an integrated feature of MEMS microphone 110.

According to an embodiment, acoustic horn 120 can be integral with the substrate or housing, or casing of MEMS microphone 110. For example, acoustic horn 120 can be integral with the casing or packaging of MEMS microphone 110. According to another example, acoustic horn 120 can be integrated with the material surrounding the port of MEMS microphone 110.

Acoustic horn 120 may be constructed from a multitude of different materials, for example, acoustic horn 120 may be constructed with 3-D printed materials, injection molded plastics, silicone, cast materials, metal, ceramics, natural materials, rubber, materials facilitating acoustic amplification, materials facilitating acoustic attenuation, or combinations of materials. Furthermore, acoustic horn 120 may be curved, spiraled, angled, folded, bent, or otherwise non-linearly arranged in order to allow the horn to fit certain physical dimensions or applications while still maintaining the desired amplification, SNR, and directionality requirements of the horn.

Still referring to FIG. 1, acoustic horn 120 can be designed to provide amplification for frequencies above 2000 Hz in order to achieve benefits associated with improving human speech intelligibility in audio systems. The air conduction wavelength for a cutoff frequency of 2000 Hz is about 16.57 cm for standard conditions for temperature and pressure. Accordingly, for a horn with a cutoff frequency of about 2000 Hz, a minimum effective length for acoustic horn 120 can be about 4.14 cm (=16.57 cm/4) or 41.4 mm. One skilled in the art will recognize that the effective length of acoustic horn 120 may be shorter or longer than 41.4 mm. For example, a horn can be designed to provide amplification for various frequencies associated with various components of human speech. According to one embodiment, an acoustic horn can have an effective length within the range of 40 mm to 250 mm.

Again, referring to FIG. 1, acoustic horn 120 can be designed to provide specific values of amplification in order to achieve benefits associated with improving human speech intelligibility in audio systems including the improvement of SNR of a MEMS microphone. The value of amplification of acoustic horn 120 is a function of the ratio of the cross-sectional area of mouth 140 to the cross-sectional area of throat 130. For example, according to an embodiment, the ratio of the cross-sectional area of mouth 140 to the cross-sectional area of throat 130 can be 4:1. According to another embodiment, the ratio of the cross-sectional area of mouth 140 to the cross-sectional area of throat 130 can be between 4:1 and 25:1 in order to provide benefits associated with improving human speech intelligibility in audio systems including the improvement of SNR of a MEMS microphone.

Figure 2:
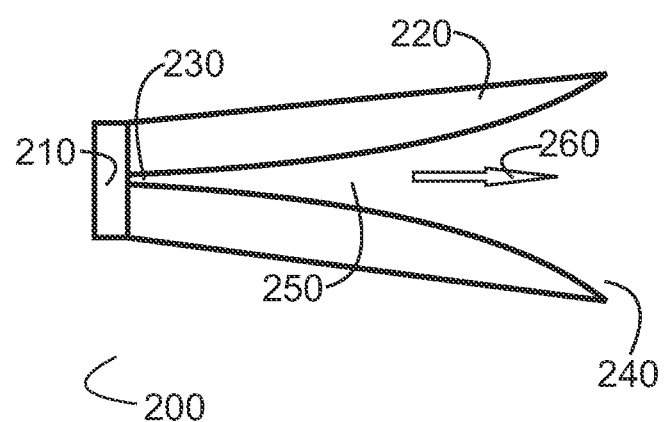
FIG. 2 illustrates a schematic diagram of an acoustic horn for MEMS microphones, audio systems and/or devices in accordance with various embodiments.

FIG. 2 illustrates a schematic diagram of an audio system 200 comprising a MEMS microphone 210 with acoustic horn 220. MEMS microphone 210 can be coupled to acoustic horn 220 directly or indirectly via an intermediate component or components (not shown). Intermediate component(s) can include, a gasket, a diaphragm, a moisture barrier, a flexible tube, a through-hole mounting on a circuit board, mounting screws, an attachment mechanism, an intermediate structure, a buffer material, a sealant, a tape, a film, a layer, an adhesive, glue, or epoxy, etc. MEMS microphone 210 may be any type of MEMS microphone, for example, MEMS microphone 210 may be a MEMS microphone die, a substrate of a MEMS microphone, a circuit board to which a MEMS microphone is mounted, a top port MEMS microphone, a bottom port MEMS microphone, a side port MEMS microphone, a MEMS microphone with digital output, or a MEMS microphone with analog output. Acoustic horn 220 may be any type of acoustic horn, for example, acoustic horn 220 may be an exponential horn, a parabolic horn, a conical horn, a hyperbolic horn, a hyperbolic-exponential or hypex horn, a tractrix horn, a flaring horn, a horn with a smooth continuous surface, or a horn with discontinuous or stepped surface. Acoustic horn 220 can act as an acoustic transformer, changing low pressure and high volume at the mouth 240 of the horn to high pressure and low volume at the throat 230 of the horn. The cross-sectional area of the horn at effective length 250 from the throat 230 can be designed to increase as distance 260 from the throat 230 increases. The cross-sectional area 250 of horn 220 at an effective length along axis 260 from throat 230 may be of any shape, for example, the cross-sectional area may be circular, oval, rectangular, square, multi-sided, or combinations of these.

According to an embodiment, audio system 200 can comprise a MEMS microphone 210 with acoustic horn 220 wherein acoustic horn 220 and MEMS microphone 210 are distinct components joined, attached, or coupled together.

According to another embodiment, audio system 200 can comprise a MEMS microphone 210 with acoustic horn 220 wherein acoustic horn 220 can be integrated with a part of another structure, for example, a molding, a casing, a surface feature, a printed circuit board, steering wheel, cell phone case, parabolic sound collecting dish, television case, monitor case, tablet case, cell phone case, hearable case, hearing aid housing, or laptop case, or a secondary case intended to be attached overlying at least a portion of a an audio system, television, monitor, tablet, cell phone, hearable, or laptop.

Figure 3:
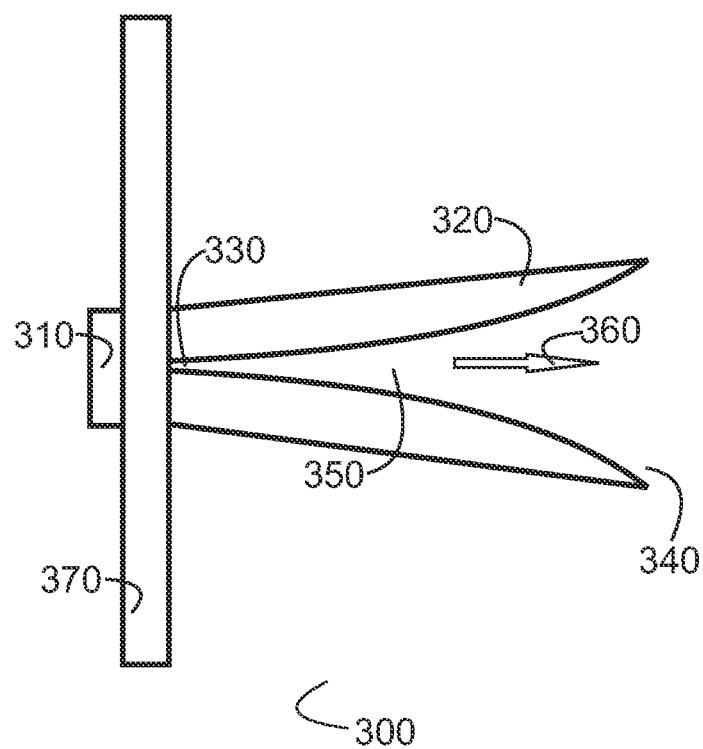
FIG. 3 illustrates a schematic diagram of an acoustic horn for MEMS microphones, audio systems and/or devices in accordance with various embodiments.

FIG. 3 illustrates a schematic diagram of an audio system 300 similar to audio system 200 of FIG. 2 and/or audio system 100 of FIG. 1, additionally comprising an interface component 370 which can provide an attachment, interface, or coupling between a MEMS microphone 310 and an acoustic horn 320. Interface component 370 can be any type of interface component or components, for example, interface component 370 can be a gasket, a diaphragm, a moisture barrier, a flexible tube, a through-hole mounting on a circuit board, mounting screws, an attachment mechanism, an intermediate structure, a buffer material, a tape, a film, a layer, a sealant, an adhesive, glue, or epoxy, etc.

According to an embodiment, interface component 370 can further comprise an opening, a feature, a medium, sound transmitting material, or a hole that can allow sound energy to pass from acoustic horn 320 to MEMS microphone 310.

Figure 4:
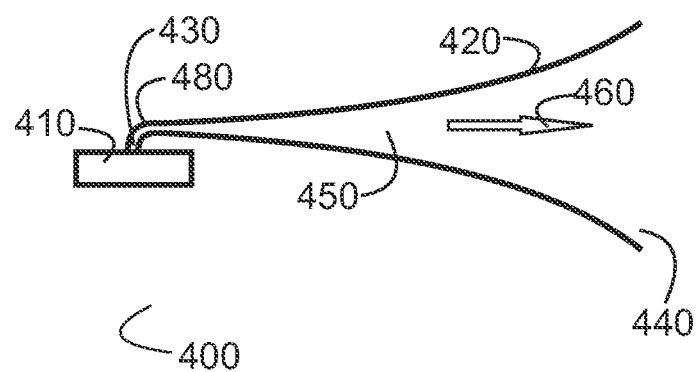
FIG. 4 illustrates a schematic diagram of an acoustic horn for MEMS microphone, audio system and/or device in accordance with various embodiments.

FIG. 4 illustrates a schematic diagram of an audio system 400 similar to any of audio system 300 of FIG. 3, audio system 200 of FIG. 2, and/or audio system 100 of FIG. 1, additionally comprising a bend or angle 480 within acoustic horn 420. Bend 480 can be designed so that acoustic horn 420 continues to act as an acoustic transformer, changing low pressure and high volume at the mouth 440 of the horn 420 to high pressure and low volume at the throat 430 of the horn 420. Multiple bends such as bend 480 may be employed to "fold" acoustic horn 420 into a compacted space while retaining the pre-amplifier and directional preference properties of acoustic horn 420. Bend 480 can assume any configuration, for example, bend(s) 480 may be a conic helix, a conic spiral, a logarithmic spiral, a seashell surface, a labyrinth, a folded structure, or sound amplifying structure.

Figure 5:
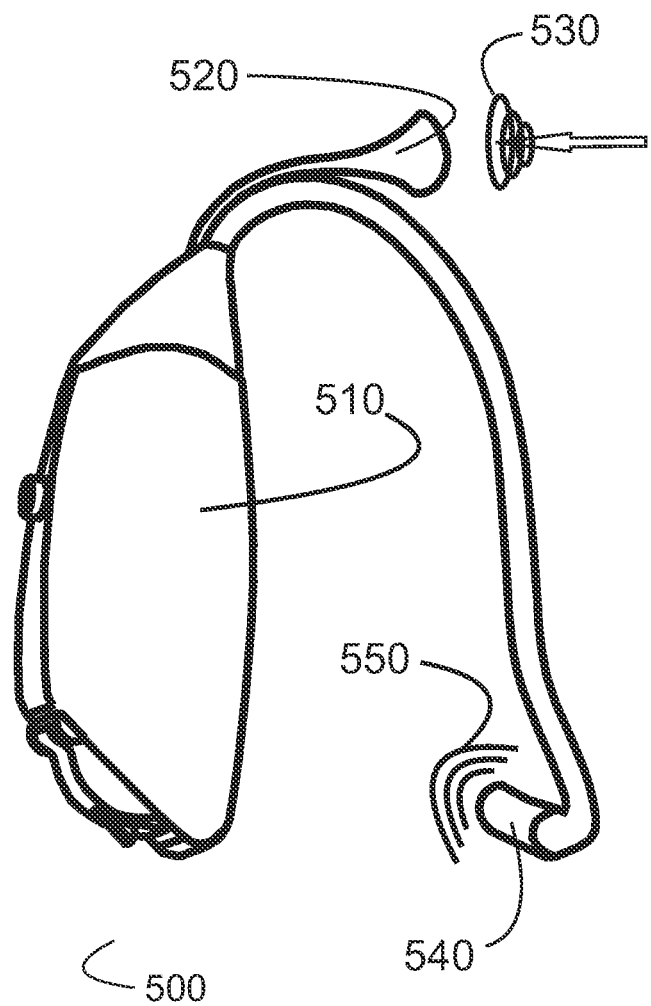
FIG. 5 illustrates a schematic diagram of an acoustic horn for MEMS microphones, audio systems and/or devices in accordance with various embodiments.

FIG. 5 illustrates an audio system 500 implementing a MEMS microphone with acoustic horn 520. According to an embodiment, audio device 500 can be a behind-the-ear (BTE) hearing aid. According to other embodiments, audio device 500 can be an over-the-counter hearing aid, an in-the-ear hearing, or any other style of hearing device. According to an embodiment, electronics, housing and battery 510 of audio device 500 can be worn behind the ear. According to an embodiment, acoustic horn 520 can be oriented to preferentially receive and amplify sound 530 arriving from the front of the user. Benefits such as selective directionality, amplification, reduction in equivalent microphone self-noise, increased mechanical support, feedback reduction resulting from the extended acoustic path and phase shift between microphone and receiver, and/or increased energy efficiency of the audio system can result from the configuration of audio system 500. According to an embodiment, a receiver or sound tube 540 can deliver sound 550 to the ear canal of the user (not shown). According to an embodiment, acoustic horn 520 can form a curved ear hook and can be positioned over the top of the user's pinna (not shown). According to another embodiment, a portion of the acoustic horn 520 and a MEMS microphone can be enclosed within the hearing aid housing 510. Those skilled in the art will recognize that there are a multitude of audio devices 500 which may benefit from a MEMS microphone with acoustic horn, for example, hearing aids, over-the-counter hearing aids, hearables, wearables, personal sound amplifiers, televisions, radios, cell phones, telephones, computers, laptops, tablets, vehicle infotainment systems, audio processing equipment and devices, personal media players, portable media players, audio reception systems, receivers, public address systems, media delivery systems, internet media players, smart speakers and devices, voice controlled systems, voice activated systems, recording devices, acoustic surveillance tools, built-in microphone systems, MEMS microphones, audio devices, subsystems within any of the above devices or systems, or any other device or system which processes audio signals.

Figure 6:
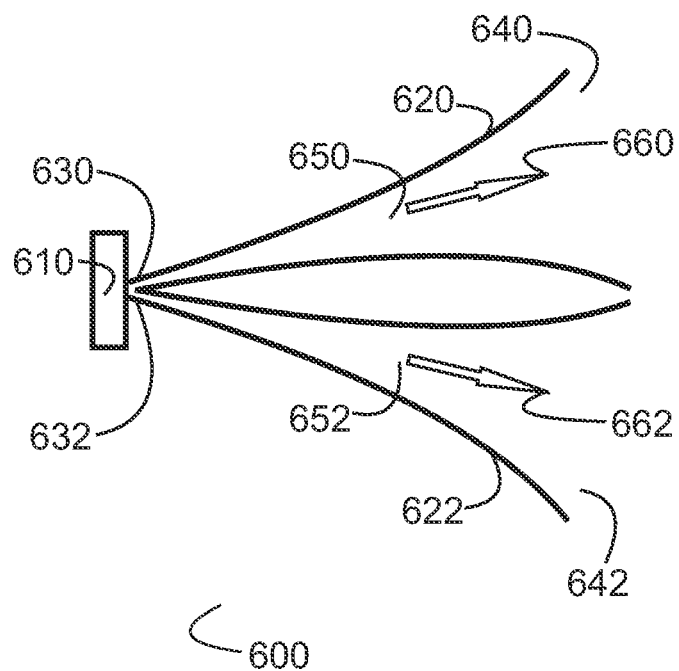
FIG. 6 illustrates a schematic diagram of an acoustic horn for MEMS microphones, audio systems and/or devices in accordance with various embodiments.

FIG. 6 illustrates a schematic diagram of an audio system 600 comprising a MEMS microphone 610 and a plurality of acoustic horns 620 and 622. According to an embodiment, audio system 600 can include additional acoustic horns and/or MEMS microphones. MEMS microphone 610 may be any type of MEMS microphone, for example, MEMS microphone 610 may be MEMS microphone die, a substrate of a MEMS microphone, a circuit board to which a MEMS microphone is mounted, a top port MEMS microphone, a bottom port MEMS microphone, a side port MEMS microphone, a MEMS microphone with digital output, or a MEMS microphone with analog output. Acoustic horn 620 and acoustic horn 622 may be any type of acoustic horns, for example, acoustic horn 620 and acoustic horn 622 may be exponential horns, parabolic horns, conical horns, hyperbolic horns, hyperbolic-exponential or hypex horns, tractrix horns, flaring horns, horns with smooth continuous surfaces, or horns with discontinuous or stepped surfaces. Acoustic horn 620 and acoustic horn 622 can act as acoustic transformers, changing low pressure and high volume at the mouths 640 and 642 of the horns 620 and 622 to high pressure and low volume at the throats 630 and 632 of the horns 620 and 622. The cross-sectional area 650 of the horn 620 can be designed to increase as along the axis 660 as the distance from throat 630 increases. The cross-sectional area 652 of the horn 622 can be designed to increase along the axis 662 as the distance from the throat 632 increases. The cross-sectional areas 650 and 652 of the horns 620 and 622 at any point along axes 660 and 662 may be of any shape, for example, the cross-sectional areas may be circular, oval, rectangular, square, multi-sided, or combinations of these. Multiple acoustic horns, for example, acoustic horn 620 and acoustic horn 622, may be configured and oriented to provide directional preference in any direction including orientation to provide directional preference in the same direction or opposite directions. Multiple acoustic horns, for example, acoustic horn 620 and acoustic horn 622, can have different total effective lengths; can be designed for different cut-off frequencies; can have different mouth cross-sectional areas 640 and 642, and can have different throat cross-sectional areas 630 and 632.

Figure 7:
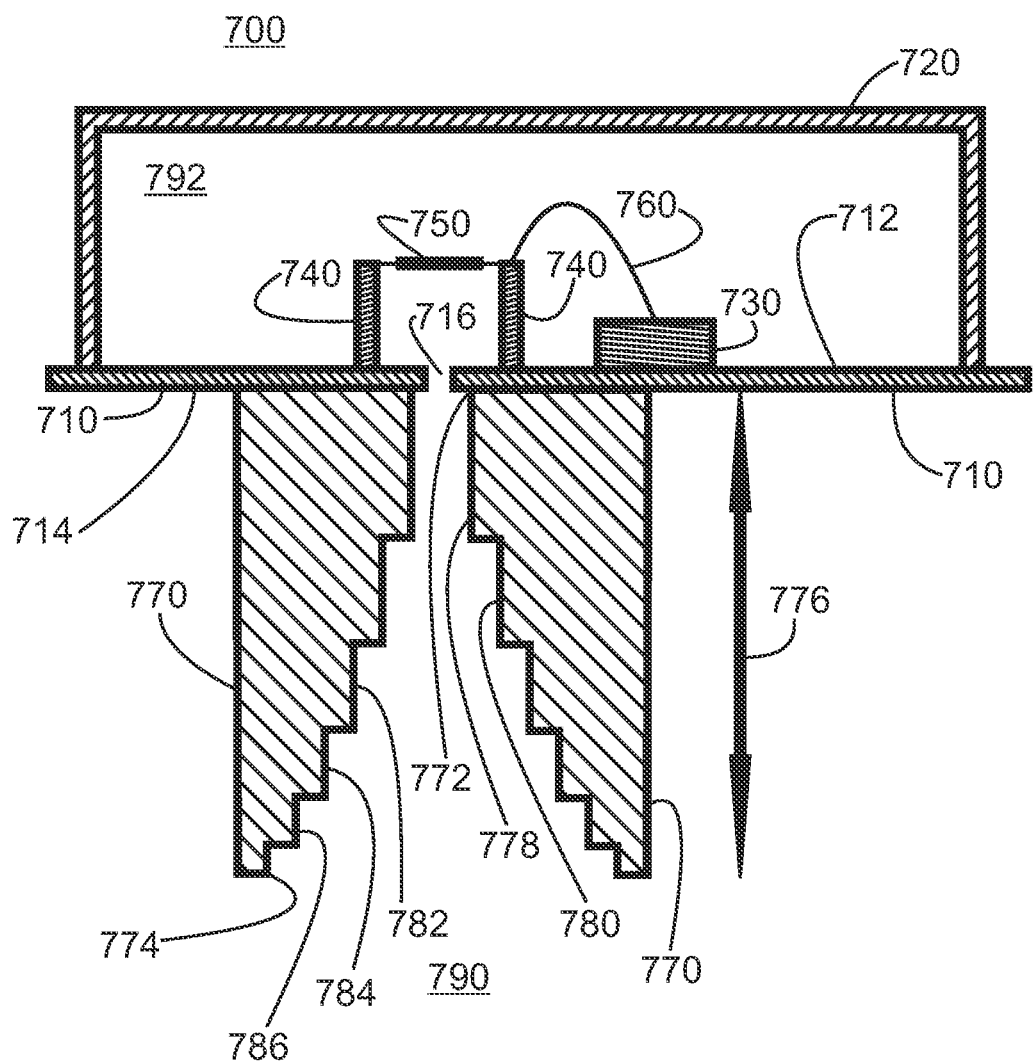
FIG. 7 illustrates a schematic diagram of an acoustic horn for MEMS microphones, audio systems, and/or devices in accordance with various embodiments.

FIG. 7 illustrates a cross-sectional view of an audio system 700. Audio system 700 comprises a MEMS microphone substrate 710; a MEMS microphone enclosure or housing 720, a MEMS microphone Application Specific Integrated Circuit (ASIC) 730; a MEMS microphone diaphragm support structure 740; a MEMS microphone pressure-sensitive diaphragm 750; and an acoustic horn 770. A port opening 716 allows sound 790 to act upon the MEMS microphone pressure-sensitive diaphragm 750. Electrical signals 760 are communicated between the MEMS microphone pressure-sensitive diaphragm 750 and the MEMS ASIC 730. Sound 790 pressure acts against the MEMS microphone pressure-sensitive diaphragm 750 and an air cavity 792 formed within the MEMS microphone device. Acoustic horn 770 has a throat 772 with an internal cross-sectional area. Acoustic horn 770 has a mouth 774 with an internal cross-sectional area. The cross-sectional area at the mouth 774 is greater than the cross-sectional area at the throat. The cross-sectional area of horn 770 may change as a function of the effective length 776 of the horn. The cross-sectional area may change in a step-wise fashion including one or more steps between throat 772 and mouth 774. According to an embodiment a plurality of steps can have varying internal cross-sectional areas 778, 780, 782, 784 and 786. The MEMS microphone substrate 710 has an inside surface 712 and an outside surface 714. The acoustic horn 770 is shown coupled to the outside surface 714 of the MEMS microphone substrate 710. According to an embodiment, the acoustic horn 770 and the MEMS microphone substrate 710 can form a single integral element. According to another embodiment, acoustic horn 770 can be attached to outside surface 714 of MEMS microphone substrate 710 using one or more of various different intermediaries, as described in relation to FIG. 3. According to an embodiment, there may be a multiplicity of stepped cross-sectional areas similar to 778, 780, 782, 784, 786, and 774. According to an embodiment acoustic horn 770 can be printed with an additive manufacturing technology such as a three-dimensional (3D) printer.

Figure 8:
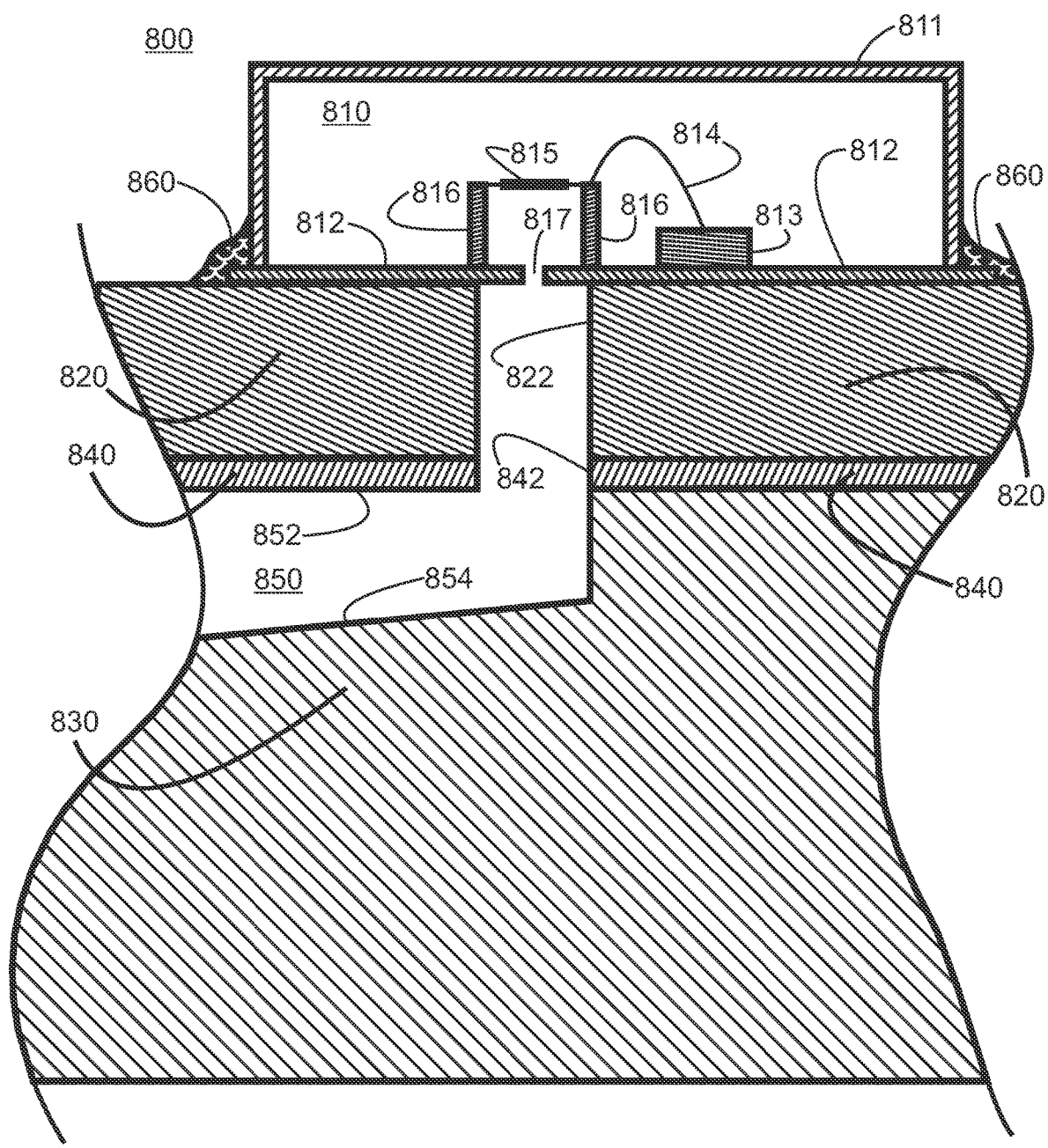
FIG. 8 illustrates a schematic diagram of an acoustic horn for MEMS microphones, audio systems, and/or devices in accordance with various embodiments.

FIG. 8 illustrates a cross-sectional view of an audio system 800. Audio system 800 comprises a MEMS microphone 810; a Printed Circuit Board (PCB) 820, an acoustic horn 830; attachment mechanism 840 to attach the PCB 820 to the acoustic horn 830; and an air-conduction sound path 850 for air-conduction sound to travel through the acoustic horn 830 to the MEMS microphone 810. Sectional lines indicate that only portions of PCB 820, acoustic horn 830, attachment mechanism 840, and air-conduction sound path 850 are shown in FIG. 8. MEMS microphone 810 comprises a MEMS microphone substrate 812, a MEMS microphone enclosure 811, a MEMS microphone Application Specific Integrated Circuit (ASIC) 813, a MEMS microphone diaphragm support structure 816, a MEMS microphone pressure-sensitive diaphragm 815, a wire or electrical connection 814 between an output of pressure-sensitive diaphragm 815 and an input of ASIC 81, and a port opening 817 to allow air-conduction sound to act upon the pressure-sensitive diaphragm 815. According to an embodiment, MEMS microphone 810 can be a surface mount device. According to an embodiment, MEMS microphone 810 can be a bottom port device. According to an embodiment, a conformal coating 860 can be used to seal MEMS microphone 810 to PCB 820. According to an embodiment, a 1 millimeter (mm) diameter through-hole 822 can be placed coaxial or near coaxial with respect to port opening 817. According to an embodiment, a 1 mm hole 842 in attachment mechanism 840 can be placed coaxial or near coaxial with respect to through-hole 822. According to an embodiment, attachment mechanism 840 can comprise a double-sided mounting tape. According to other embodiments, attachment mechanism 840 can comprise a gasket, a diaphragm, a moisture barrier, a flexible tube, an intermediate structure, a buffer material, a film, a layer, a sealant, an adhesive, glue, or epoxy, etc. According to an embodiment, air-conduction sound path 850 is effectively trapped between the surface 852 of attachment mechanism 840 and surfaces 854 of acoustic horn 830. According to an embodiment, air-conduction sound path 850 can expand linearly, or non-linearly, with the expanding surfaces 854 along the effective length of an acoustic horn 830.

Figure 9:
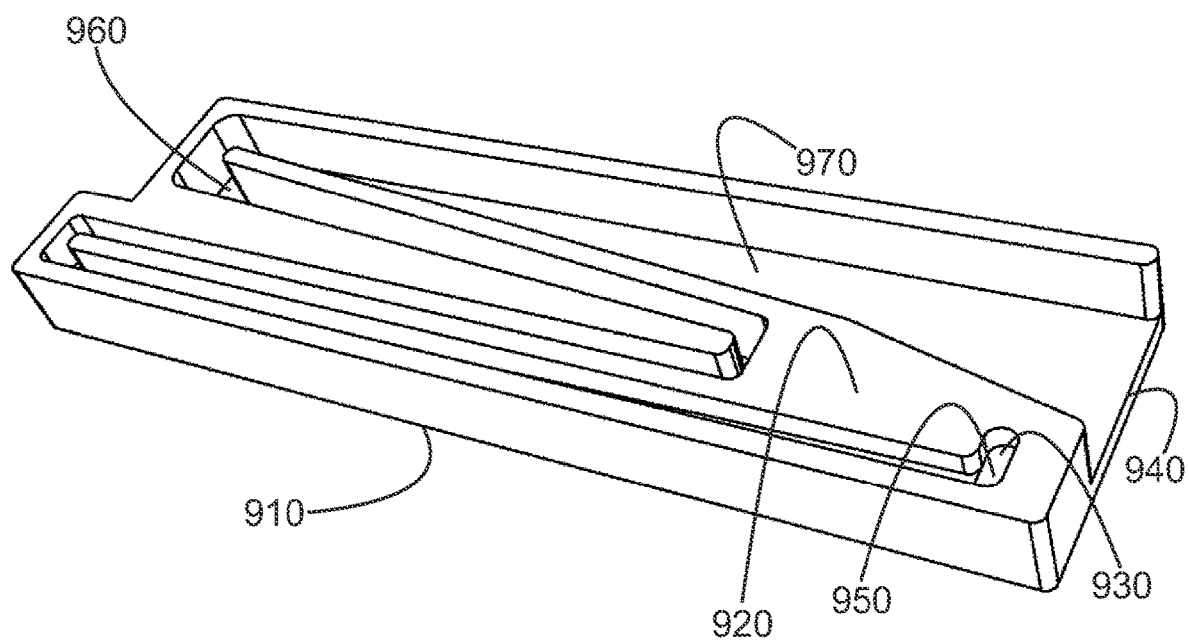
FIG. 9 illustrates a schematic diagram of a miniature acoustic horn for MEMS microphones, audio systems, and/or devices in accordance with various embodiments.

FIG. 9 illustrates a perspective view of an acoustic horn 900. According to an embodiment, the size of acoustic horn 900 is 50 mm by 13 mm by 4 mm. According to an embodiment, acoustic horn 900 can be constructed from plastic 910. Acoustic horn 900 has a top surface 920 that is substantially flat. According to an embodiment, a double-sided mounting tape (not shown) can be used to attach the top surface 920 of acoustic horn 900 to the bottom side of a PCB (not shown) according to the description of FIG. 8. The mounting tape can have a hole or opening at least over the mouth opening 930 of horn 900. Sound waves can enter horn 900 via a mouth 940 and travel along a continuous channel or interior structure 950 of horn 900 and exit at throat 930. According to an embodiment, feature 930 can have about a 1 mm diameter hole which is about 1 mm deep into top surface 920. Throat 930 can be coaxial with a surface mount MEMS microphone bottom port (not shown) positioned on a PCB (also not shown). According to an embodiment, continuous channel 950 within the top surface 920 extends between throat 930 and mouth 940. According to an embodiment, channel 950, beginning at feature 930, can be 1 mm wide by 1 mm deep and defines a throat cross-sectional area of 1 mm$^2$ of acoustic horn 900. According to an embodiment, continuous channel 950 deepens and widens such as indicated at channel locations 960 and 970. The widening and deepening of continuous channel 950 can occur gradually or in a step-wise fashion. Channel 950 terminates at mouth 940. Mouth 940 is exposed to air-conduction sound in the horn's environment. According to an embodiment, the cross-sectional area of the mouth can be about 7.4 mm by about 3 mm (22.2 mm$^2$) and the effective length of channel 950 can be about 186.8 mm, which corresponds to a sound wavelength at about 1836 Hz at 20 degrees Celsius. Accordingly, an effective length of channel 950 of 186.8 mm will tend to amplify speech frequencies above 459 Hz, corresponding to the cutoff frequency of acoustic horn 900. Efficient amplification for acoustic horn 900 can begin at about ½ octave above the cutoff frequency or about 688 Hz. Speech frequencies above about 688 Hz can be difficult to hear by many hearing impaired individuals. According to an embodiment, an acoustic horn 900 with a throat cross-sectional area of 1 mm$^2$ and a mouth cross-sectional area of 22.2 mm$^2$ can provide as much as 13.4 dB of amplification. Furthermore, maximum amplification will occur for sound sources within a 20 degree window perpendicular to mouth 940. The dimensions and parameters of acoustic horn 900 can be designed to match the footprint portion of a component of an audio system, such as a battery housing. According to an embodiment the footprint of acoustic horn 900 can be designed to match the size of a KEYSTONE 2466 "AAA" battery holder, and acoustic horn can be physically sandwiched between a KEYSTONE 2466 battery holder and a PCB having a double-sided mounting tape in contact with acoustic horn 900. One skilled in the art will recognize that any mating, flat surface, component similar to a PCB may also be combined or attached to top surface 920 in order to enclose channel 950 for purposes of enabling acoustic horn 900. Acoustic horn 900 can comprise, as described, an assembly of multiple components or alternatively, acoustic horn 900 can comprise a single, integral piece. According to an embodiment, acoustic horn 900 can be manufactured using injection molding or additive manufacturing technologies for purposes of creating one or more components which when assembled form acoustic horn 900.

According to an embodiment, an audio system similar to any of the audio systems described above in reference to FIGS. 1-9 can further include one or more additional MEMS microphone or other type of microphones. The additional microphones may or may not be coupled to an acoustic horn. Signal analysis and processing techniques can be applied to the signals generated comparatively by each microphone (whether horned or un-horned). Such techniques can yield information about the acoustic environment of a user of an audio system and can derive content and parameters from such acoustic environment of the user which can be useful in increasing the speech intelligibility of a processed audio signal that can be presented to a user of an audio system.

In reference to all of the foregoing disclosure, the above described embodiments enable solutions, improvements, and benefits to many problems and issues affecting conventional audio systems and conventional audio devices and offer improved functionality for audio systems and audio devices, for example:

First, utilizing the very small port size or die size of MEMS microphones, horns provide mechanical amplification prior to MEMS microphone acoustic signal reception.

Second, recognizing the high frequency content for intelligible speech, the effective length requirements for horns are reduced.

Third, the use of mechanical amplification with horns prior to MEMS microphone acoustic signal reception increases the signal-to-noise ratio of the MEMS microphones making at-a-distance acoustic signal reception more tolerable for the user. Fourth, using the directional preference of the horn provides MEMS microphones with a unidirectional response for acoustic signal discrimination which can be especially beneficial in otherwise noisy environments such as automobiles, crowds, restaurants, and classrooms.

Fifth, combining an acoustic horn with a MEMS microphone provides a low cost solution for increased at-a-distance speech intelligibility.

Sixth, combining an acoustic horn with a MEMS microphone enables applications requiring small physical size such as hearables and hearing aids.

Seventh, an acoustic horn can provide additional physical support for placing an audio system or hearing aid in contact with a user.

Eighth, an acoustic horn can decrease the energy consumption of an audio system thereby increasing its energy efficiency.

Ninth, the signal generated by a first horned microphone can be compared, analyzed, or processed with respect to a signal generated by a second horned microphone. Differences between the respective signals due to differences in the physical characteristics of each horn and/or in their direction can be exploited to generate information useful for processing the audio signal(s) and increasing the speech intelligibility of the processed signal to a user.

Tenth, the signal generated by a first horned microphone can be compared, analyzed, or processed with respect to a signal generated by a second un-horned microphone. Differences between the respective signals due to the differences in one microphone being horned and the other microphone being un-horned can be exploited to generate information useful for processing the audio signal(s) and increasing the speech intelligibility of the processed signal to a user.

Eleventh, for applications requiring small physical size such as hearables and hearing aids, the horn extends the acoustic path and phase difference between the MEMS microphone and the receiver greatly diminishing potential feedback. For most users, a non-occluding, open-fit configuration is preferable especially if other objects can be used in immediate proximity, such as a cell phone.

In view of the above it is evident that acoustic horns for MEMS microphones have at least the following characteristics: low cost, small size, improved signal-to-noise, improved at-a-distance speech intelligibility, directional discrimination, reduced feedback, and increased energy efficiency of audio systems.

Benefits, other advantages, and solutions to problems and issues have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

In view of all of the above, it is evident that novel audio systems, audio devices, microphones, and methods are disclosed.

While the subject matter of the invention is described with specific and example embodiments, the foregoing drawings and descriptions thereof depict only typical embodiments of the subject matter, and are not therefore to be considered limiting of its scope. It is evident that many alternatives and variations will be apparent to those skilled in the art and that those alternatives and variations are intended to be included within the scope of the present invention. For example, some embodiments described herein include some elements or features but not other elements or features included in other embodiments, thus, combinations of features or elements of different embodiments are meant to be within the scope of the invention and are meant to form different embodiments as would be understood by those skilled in the art. Furthermore, any of the above-described elements, components, blocks, systems, structures, devices, ranges and selection of ranges, applications, programming, signal processing, signal analysis, signal filtering, implementations, proportions, flows, or arrangements, used in the practice of the present invention, including those not specifically recited, may be varied or otherwise particularly adapted to specific environments, users, groups of users, populations, manufacturing specifications, design parameters, or other operating requirements without departing from the scope of the present invention. Additionally, the steps recited in any method or processing scheme described above or in the claims may be executed in any order and are not limited to the specific order presented in the above description or in the claims. Finally, the components and/or elements recited in any apparatus claims may be assembled or otherwise operationally configured in a variety of permutations and are accordingly not limited to the specific configuration recited in the claims.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of the invention.

What is claimed is:

1. An audio system, comprising:
a MEMS microphone package, wherein the MEMS microphone package comprises a substrate having a first surface and a second surface opposite the first surface, and wherein the substrate also comprises a port hole extending through the substrate from the first surface to the second surface;
a pressure-sensitive diaphragm within the MEMS microphone package;
an acoustic horn coupled to the second surface of the substrate, wherein the acoustic horn comprises a throat opening, a mouth opening, an interior surface forming an acoustic channel extending between the mouth opening and the throat opening, and wherein the second surface of the substrate, and the port hole, overlay at least a portion of the acoustic channel from the throat opening to the mouth opening, wherein the interior surface of the acoustic horn forms a parabolic surface, wherein the cross-sectional area defined by the acoustic horn increases along the length of the acoustic horn from the throat opening to the mouth opening, and wherein the acoustic horn comprises a silicone material.

2. The audio system of claim 1, wherein a portion of the acoustic channel extending from the throat opening of the acoustic horn to the mouth opening of the acoustic horn, extends substantially perpendicular to the second surface of the substrate.

3. The audio system of claim 2, wherein a portion of the acoustic channel includes at least one bend.

4. The audio system of claim 1, wherein the cross-sectional area defined by the acoustic horn increases in a stepped manner along at least a portion of the length of the acoustic horn from the throat opening to the mouth opening.

5. The audio system of claim 1, wherein the acoustic horn is integral with the substrate.

6. The audio system of claim 1, wherein the acoustic horn is configured to substantially amplify sound frequencies above the audible frequencies.

7. The audio system of claim 1, wherein the acoustic horn is configured to substantially amplify sound frequencies within the audible frequencies.

8. An audio system, comprising:
a MEMS microphone package, wherein the MEMS microphone package comprises a substrate having a first surface and a second surface opposite the first surface, and wherein the substrate also comprises a port hole extending through the substrate from the first surface to the second surface;
a pressure-sensitive diaphragm within the MEMS microphone package;
an acoustic horn coupled to the second surface of the substrate, wherein the acoustic horn comprises a throat opening, a mouth opening, an interior surface forming an acoustic channel extending between the mouth opening and the throat opening, and wherein the second surface of the substrate, and the port hole, overlay at least a portion of the acoustic channel from the throat opening to the mouth opening, wherein the interior surface of the acoustic horn forms a parabolic surface, wherein the acoustic horn comprises a silicone material, and wherein the acoustic horn is configured to substantially amplify sound frequencies above the audible frequencies.

9. The audio system of claim 8, wherein a portion of the acoustic channel extending from the throat opening of the acoustic horn to the mouth opening of the acoustic horn, extends substantially perpendicular to the second surface of the substrate.

10. The audio system of claim 9, wherein a portion of the acoustic channel includes at least one bend.

11. The audio system of claim 8, wherein the cross-sectional area defined by the acoustic horn increases in a stepped manner along at least a portion of the length of the acoustic horn from the throat opening to the mouth opening.

12. The audio system of claim 8, wherein the acoustic horn is integral with the substrate.

* * * * *